United States Patent [19]
Tovey

[11] Patent Number: 5,896,766
[45] Date of Patent: Apr. 27, 1999

[54] PARKING BRAKE LOCKING DEVICE

[76] Inventor: Adam Tovey, 7 Tallon Road, Etobicoke, Ontario, Canada, M9P 1M4

[21] Appl. No.: 09/054,251

[22] Filed: Apr. 2, 1998

[51] Int. Cl.⁶ .................................................. B60R 25/04
[52] U.S. Cl. ................................................. 70/202; 70/19
[58] Field of Search .................................. 70/14, 18, 19, 70/201, 202, 181–187, 237, 238, 245

[56] References Cited

U.S. PATENT DOCUMENTS

| | | | |
|---|---|---|---|
| 1,717,602 | 6/1929 | Goodspeed | 70/202 X |
| 1,764,383 | 6/1930 | Bezek | 70/202 |
| 3,889,499 | 6/1975 | Cramer | 70/202 |
| 4,015,455 | 4/1977 | Leverton | 70/202 X |
| 5,379,619 | 1/1995 | Young | 70/202 |
| 5,701,769 | 12/1997 | Hall | 70/19 |

FOREIGN PATENT DOCUMENTS

| | | | |
|---|---|---|---|
| 514460 | 3/1921 | France | 70/202 |
| 609750 | 8/1926 | France | 70/202 |
| 619122 | 3/1927 | France | 70/202 |
| 652145 | 3/1929 | France | 70/202 |
| 40640 | 4/1915 | Sweden | 70/202 |
| 1162018 | 8/1969 | United Kingdom | 70/202 |

*Primary Examiner*—Suzanne Dino Barrett

[57] ABSTRACT

A parking brake locking device is provided including a parking brake having an elongated cylindrical configuration. The parking brake has a first end hingably coupled to a floor of a vehicle adjacent to a front seat thereof and is adapted to pivot between a deactuated lowered orientation and an actuated raised orientation. Also included is a locking arm mounted to the floor of the vehicle. The locking arm engages the parking brake for selectively precluding the transfer of the parking brake from the actuated raised orientation to the deactuated lower orientation.

7 Claims, 2 Drawing Sheets

PARKING BRAKE LOCKING DEVICE

BACKGROUND OF THE INVENTION

1. Field of the Invention

The present invention relates to parking brake sleeve-type locks and more particularly pertains to a new PARKING BRAKE LOCKING DEVICE for selectively precluding the deactuation of a parking brake with a locking assembly mounted to a floor of a vehicle.

2. Description of the Prior Art

The use of parking brake sleeve-type locks is known in the prior art. More specifically, parking brake sleeve-type locks heretofore devised and utilized are known to consist basically of familiar, expected and obvious structural configurations, notwithstanding the myriad of designs encompassed by the crowded prior art which have been developed for the fulfillment of countless objectives and requirements.

Known prior art parking brake sleeve-type locks include U.S. Pat. No. 4,708,055; U.S. Pat. No. 5,325,688; U.S. Pat. No. 5,003,798; U.S. Pat. No. 4,995,250; and U.S. Pat. No. 4,936,120.

In these respects, the parking brake locking device according to the present invention substantially departs from the conventional concepts and designs of the prior art, and in so doing provides an apparatus primarily developed for the purpose of selectively precluding the deactuation of a parking brake with a locking assembly mounted to a floor of a vehicle.

SUMMARY OF THE INVENTION

In view of the foregoing disadvantages inherent in the known types of parking brake sleeve-type locks now present in the prior art, the present invention provides a new parking brake locking device construction wherein the same can be utilized for selectively precluding the deactuation of a parking brake with a locking assembly mounted to a floor of a vehicle.

The general purpose of the present invention, which will be described subsequently in greater detail, is to provide a new parking brake locking device apparatus and method which has many of the advantages of the parking brake sleeve-type locks mentioned heretofore and many novel features that result in a new parking brake locking device which is not anticipated, rendered obvious, suggested, or even implied by any of the prior art parking brake sleeve-type locks, either alone or in any combination thereof.

To attain this, the present invention generally comprises a parking brake having an elongated cylindrical configuration with a first end hingably coupled a floor of a vehicle. Such coupling is preferably effected adjacent to a front seat of the vehicle. The parking brake further has a second end with a hand grip to facilitate the pivoting of the parking brake between a deactuated lowered orientation and an actuated raised orientation. As shown FIGS. 1 & 2, the parking brake further has a push button with a biased depressed orientation for allowing the transfer of the parking brake between the raised and lowered orientation. The push button further has an unbiased released orientation for precluding the transfer of the parking brake between the raised and lowered orientation. Next provided is a mounting base having a planar lower portion with a rectangular configuration. A pair of generally triangular-shaped ears are integrally coupled to a central extent of the lower portion and extend upwardly therefrom in parallel relationship. The lower portion further has an aperture formed in each of four corners thereof for allowing the mounting base to be mounted to the floor of the vehicle by way of a plurality of bolts. As shown in FIGS. 3 & 4, the ears have coax ially aligned bores formed in central extents thereof. For reasons that will become apparent hereinafter, the mounting base further includes a latch insert portion situated between the ears in fixed relationship therewith. The latch insert portion includes a vertically orientated recess formed therein with a square vertical and horizontal cross-section. With reference again to FIGS. 1 & 2, it is shown that a locking arm is provided having a top end with a closed loop situated thereon. The closed loop is adapted for slidably receiving an intermediate extent of the parking brake. A bottom end of the locking arm is equipped with a pair of diametrically opposed protrusions integrally coupled thereto. The protrusion serve for being pivotally situated within the bores formed in the ears of the mounting base. By this structure, the locking arm has a forward orientation when the parking brake is in the lowered orientation and a vertical orientation when the parking brake is in the raised orientation. Finally, a locking assembly is provided having a cylindrical key portion situated within the locking arm adjacent the bottom end thereof. Connected to the key portion is a rectilinear latch that is slidably situated in coaxial relationship with the locking arm. During use, the latch has a raised orientation for permitting the pivoting of the locking arm between the forward and vertical orientation. The latch has a lowered orientation situated within the recess of the inset portion for precluding the pivoting of the locking arm from the vertical orientation. As such, the latch prevents the transfer of the parking brake to the deactuated lowered orientation. It should be noted that the latch may be raised and lowered only upon the insertion of a key within the key portion and the rotation thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who arc not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new parking brake locking device apparatus and method which has many of the advantages of the parking brake sleeve-type locks mentioned heretofore and many novel features that result in a new parking brake locking device which is not anticipated, rendered obvious, suggested, or even implied by any of the prior art parking brake sleeve-type locks, either alone or in any combination thereof.

It is another object of the present invention to provide a new parking brake locking device which may be easily and efficiently manufactured and marketed.

It is a further object of the present invention to provide a new parking brake locking device which is of a durable and reliable construction.

An even further object of the present invention is to provide a new parking brake locking device which is susceptible of a low cost of manufacture with regard to both materials and labor, and which accordingly is then susceptible of low prices of sale to the consuming public, thereby making such parking brake locking device economically available to the buying public.

Still yet another object of the present invention is to provide a new parking brake locking device which provides in the apparatuses and methods of the prior art some of the advantages thereof, while simultaneously overcoming some of the disadvantages normally associated therewith.

Still another object of the present invention is to provide a new parking brake locking device for selectively precluding the deactuation of a parking brake with a locking assembly mounted to a floor of the vehicle.

Even still another object of the present invention is to provide a new parking brake locking device that includes a parking brake having an elongated cylindrical configuration. The parking brake has a first end hingably coupled a floor of a vehicle adjacent to a front seat thereof and is adapted to pivot between a deactuated lowered orientation and an actuated raised orientation. Also included is a locking arm mounted to the floor of the vehicle. The locking arm engages the parking brake for selectively precluding the transfer of the parking brake from the actuated raised orientation to the deactuated lower orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
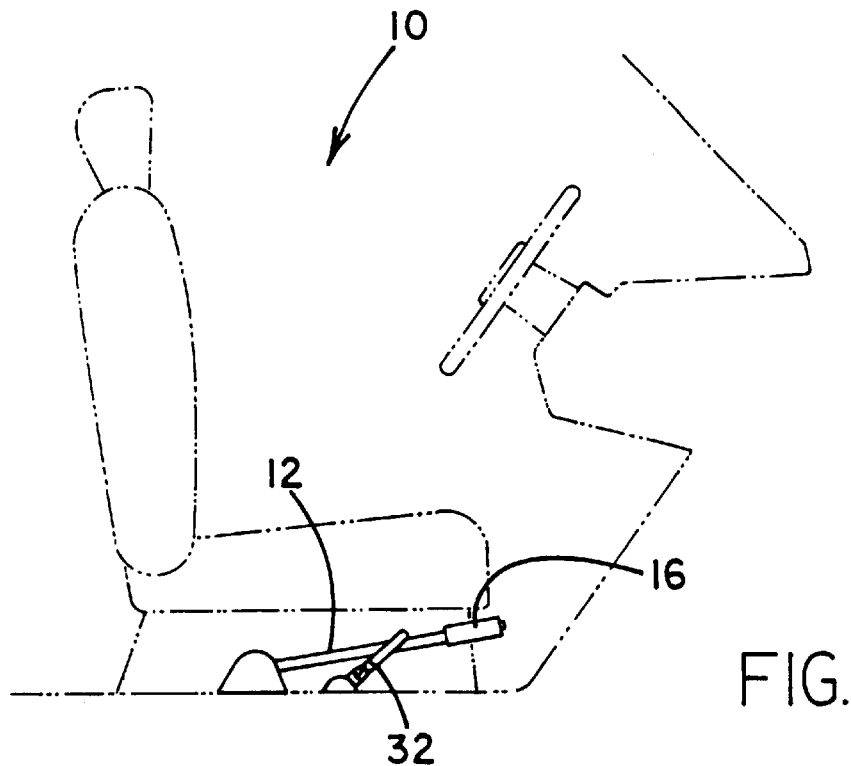
FIG. 1 is a side view of a new parking brake locking device according to the present invention.

With reference now to the drawings, and in particular to FIGS. 1 through 4 thereof, a new parking brake locking device embodying the principles and concepts of the present invention and generally designated by the reference numeral 10 will be described.

The present invention, as designated as numeral 10, includes a parking brake 12 having an elongated cylindrical configuration with a first end hingably coupled a floor 14 of a vehicle. Such coupling is preferably effected adjacent to a front seat of the vehicle. The parking brake further has a second end with a hand grip 16 to facilitate the pivoting of the parking brake between a deactuated lowered orientation and an actuated raised orientation.

Figure 2:
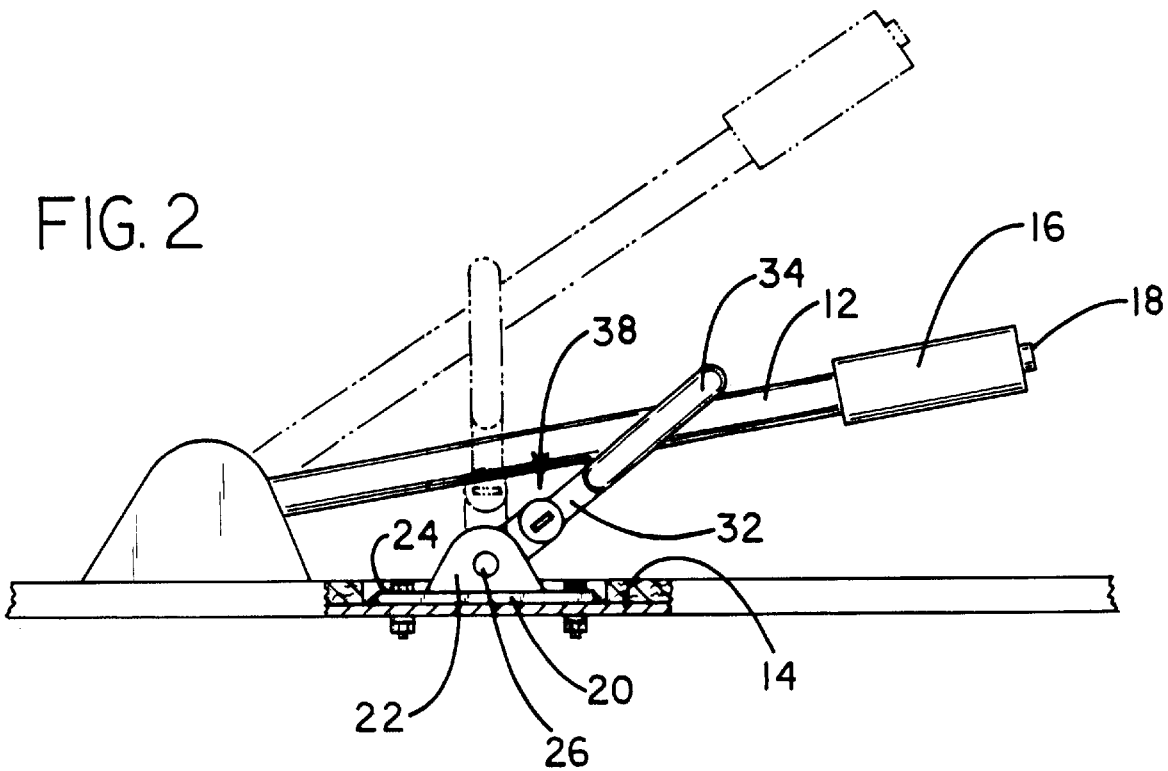
FIG. 2 is a close-up side view of the present invention during use.

As shown FIGS. 1 & 2, the parking brake further has a push button 18 with a biased depressed orientation for allowing the transfer of the parking brake between the raised and lowered orientation. The push button further has an unbiased released orientation for precluding the transfer of the parking brake between the raised and lowered orientation.

Figure 3:
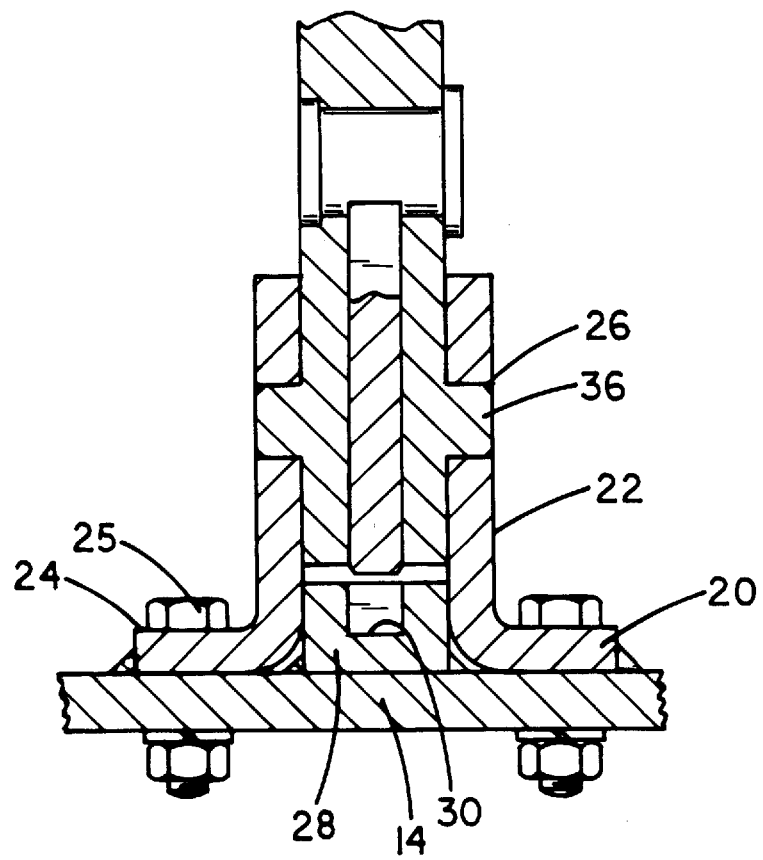
FIG. 3 is a cross-sectional view of the present invention showing the latch in a raised orientation.
Figure 4:
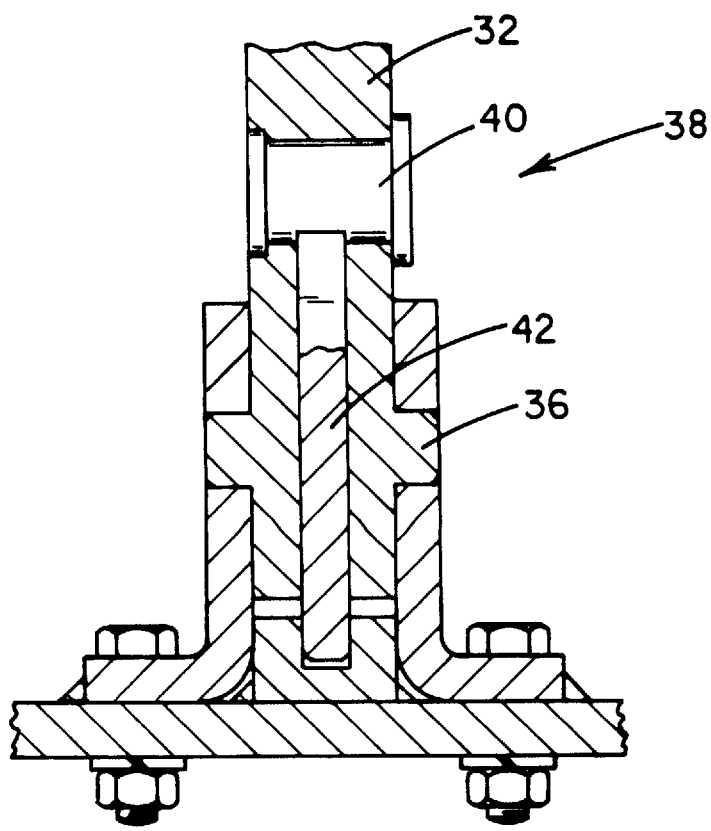
FIG. 4 is a cross-sectional view of the present invention showing the latch in a lowered orientation.

Next provided is a mounting base 20 having a planar lower portion with a rectangular configuration. A pair of generally triangular-shaped cars 22 are integrally coupled to a central extent of the lower portion and extend upwardly therefrom in parallel relationship. The lower portion further has an aperture 24 formed in each of four corners thereof for allowing the mounting base to be mounted to the floor of the vehicle by way of a plurality of bolts 25. As shown in FIG. 2, the mounting base is preferably mounted directly to the floor of the vehicle and is encompassed by a cut out formed in a carpet of the vehicle. As shown in FIGS. 3 & 4, the ears have coaxially aligned bores 26 formed in central extents thereof. For reasons that will become apparent hereinafter, the mounting base further includes a latch insert portion 28 situated between the ears in fixed relationship therewith. The latch insert portion includes a vertically orientated recess 30 formed therein with a square vertical and horizontal cross-section.

With reference again to FIGS. 1 & 2, it is shown that a locking arm 32 is provided having a top end with a closed loop 34 fixedly situated thereon. The closed loop is adapted for slidably receiving an intermediate extent of the parking brake. While not shown, it is imperative that an opening defined by the closed loop have an area slightly larger than that of a cross-section of the parking brake to allow free movement. A bottom end of the locking arm is equipped with a pair of diametrically opposed protrusions 36 integrally coupled thereto. The protrusion serve for being pivotally situated within the bores formed in the cars of the mounting base. By this structure, the locking arm has a forward orientation when the parking brake is in the lowered orientation and a vertical orientation when the parking brake is in the raised orientation.

Finally, a locking assembly 38 is provided having a cylindrical key portion 40 situated within the locking arm adjacent the bottom end thereof. A key inlet of the key portion preferably faces a passenger seat of the vehicle. Connected to the key portion is a rectilinear latch 42 that is slidably situated in coaxial relationship with the locking arm. During use, the latch has a raised orientation for permitting the pivoting of the locking arm between the forward and vertical orientation. The latch further has a lowered orientation situated within the recess of the inset portion for precluding the pivoting of the locking arm from the vertical orientation. As such, the latch prevents the transfer of the parking brake to the deactuated lowered orientation. It should be noted that the latch may be raised and lowered only upon the insertion of a key within the key portion with the subsequent rotation thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A parking brake locking system comprising, in combination:

a parking brake having an elongated cylindrical configuration with a first end hingably coupled to a floor of a vehicle adjacent to a front seat thereof, the parking brake further having a second end with a hand grip to facilitate the pivoting of the parking brake between a deactuated lowered orientation and an actuated raised orientation, the parking brake further having a push button with a biased depressed orientation for allowing the transfer of the parking brake between the raised and lowered orientation and an unbiased released orientation for precluding the transfer of the parking brake between the raised and lowered orientation;

a mounting base having a planar lower portion with a rectangular configuration and a pair of generally triangular-shaped ears integrally coupled to a central extent thereof and extending upwardly therefrom in parallel relationship, the lower portion having an aperture formed in each of four corners thereof for allowing the mounting base to be mounted to the floor of the vehicle by way of a plurality of bolts in front of the first end of the parking brake, the ears having coaxially aligned bores formed in a central extent thereof, the mounting base further including a latch insert portion situated between the ears in fixed relationship therewith, the latch insert portion having a vertically orientated recess formed therein with a square vertical and horizontal cross-section;

a locking arm having a top end with a closed loop situated thereon for slidably receiving an intermediate extent of the parking brake and a bottom end with a pair of diametrically opposed protrusions integrally coupled thereto for being pivotally situated within the bores formed in the ears of the mounting base such that the locking arm has a forward orientation when the parking brake is in the lowered orientation and a vertical orientation when the parking brake is in the raised orientation; and a locking assembly having a cylindrical key portion situated within the locking arm adjacent the bottom end thereof and a rectilinear latch connected to the key portion and slidably situated in coaxial relationship with the locking arm and protruding from the bottom end thereof, the latch having a raised orientation for permitting the pivoting of the locking arm between the forward and vertical orientation and a lowered orientation situated within the recess of the insert portion for precluding the pivoting of the locking arm from the vertical orientation thereby preventing the transfer of the parking brake to the deactuated lowered orientation, whereby the latch may be raised and lowered only upon the insertion of a key within the key portion and the rotation thereof.

2. A parking brake locking device adapted for use with a parking brake having an elongated configuration with a first end hingably coupled to a floor of a vehicle adjacent to a front seat thereof, the parking brake adapted to pivot between a deactuated lowered orientation and an actuated raised orientation, the device comprising:

a locking arm pivotally coupled to a mounting assembly which is mounted to the floor of the vehicle, the locking arm engaging the parking brake for selectively precluding the transfer of the parking brake from the actuated raised orientation to the deactuated lower orientations wherein the locking arm has a locking assembly mounted thereon including a latch removably received within a recess formed in the mounting assembly.

3. A parking brake locking device as set forth claim 2 wherein the locking arm has a closed loop for slidably receiving the parking brake.

4. A parking brake locking device as set forth claim 2 wherein the locking arm is mounted in front of the parking brake.

5. A parking brake locking device adapted for use with a parking brake having an elongated configuration with a first end hingably coupled to a floor of a vehicle adjacent to a front seat thereof, the parking brake adapted to pivot between a deactuated lowered orientation and an actuated raised orientation, the device comprising:

a locking arm pivotally coupled to the floor of the vehicle, the locking arm engaging the parking brake for selectively precluding the transfer of the parking brake from the actuated raised orientation to the deactuated lower orientation;

wherein the locking arm has a locking assembly mounted thereon including a latch which is slidable along an axis about which the locking arm is formed and is removably received within a recess fixed with respect to the floor of the vehicle;

wherein the locking assembly further includes a key mechanism which slides the latch upon the rotation thereof about an axis perpendicular with respect to that associated with the latch.

6. A parking brake locking device as set forth claim 5 wherein the locking arm has a closed loop for slidably receiving the parking brake.

7. A parking brake locking device as set forth claim 5 wherein the locking arm is mounted in front of the parking brake.

* * * * *